(12) United States Patent
Labrot et al.

(10) Patent No.: US 6,532,768 B1
(45) Date of Patent: Mar. 18, 2003

(54) PROCESS FOR THE VITRIFICATION OF A PULVERULENT MATERIAL AND APPARATUS FOR IMPLEMENTING THE PROCESS

(75) Inventors: Maxime Labrot, Bordeaux (FR); Vincent Beudin, Bordeaux (FR); Bruno Guihard, Mengnai (FR); Didier Pineau, Le Bouscat (FR)

(73) Assignees: Europlasma, Saint Medard en Jalles (FR); Societe Anonyme d'Economie Mixte Communautaire de Gestion, Bordeaux (FR); Aeropatiale Societe Nationale Industrielle, Paris (FR)

( * ) Notice: Subject to any disclaimer, the term of this patent is extended or adjusted under 35 U.S.C. 154(b) by 0 days.

(21) Appl. No.: 09/446,299

(22) PCT Filed: Jun. 18, 1998

(86) PCT No.: PCT/FR98/01268

§ 371 (c)(1),
(2), (4) Date: Mar. 14, 2000

(87) PCT Pub. No.: WO98/58882

PCT Pub. Date: Dec. 30, 1998

(30) Foreign Application Priority Data

Jun. 20, 1997 (FR) ............................................. 97 07720

(51) Int. Cl.⁷ ............................................. C03B 5/183
(52) U.S. Cl. .................... 65/29.16; 65/29.17; 65/29.21; 65/134.3; 65/134.6; 65/134.8; 65/136.3; 65/162; 65/335; 110/185; 110/186; 588/11; 588/227; 588/252
(58) Field of Search ............................ 65/29.16, 29.17, 65/29.21, 33.2, 83, 101, 134.3, 134.6, 134.8, 136.3, 136.2, 162, 160, 185, 193, 253, 335, 347, 356; 110/185, 186; 588/11, 252, 227

(56) References Cited

U.S. PATENT DOCUMENTS

| 1,761,229 A | | 6/1930 | Pederson |
| 1,999,762 A | | 4/1935 | Howard |
| 4,998,486 A | * | 3/1991 | Dighe et al. ................. 110/236 |
| 5,280,757 A | * | 1/1994 | Carter et al. ................. 110/250 |
| 5,284,503 A | * | 2/1994 | Bitler et al. ................ 75/10.19 |
| 5,319,176 A | | 6/1994 | Alvi et al. |
| 5,535,234 A | * | 7/1996 | Bullmann .................... 110/234 |
| 5,571,301 A | * | 11/1996 | Yamaura et al. ............ 588/256 |
| 5,637,127 A | * | 6/1997 | McLaughlin et al. ........ 501/155 |
| 5,678,236 A | * | 10/1997 | Macedo et al. ................ 588/11 |

FOREIGN PATENT DOCUMENTS

| EP | 0 670 188 | 9/1995 |
| FR | 2 708 217 | 2/1995 |
| WO | WO 90/02711 | 3/1990 |
| WO | WO 92/15532 | 9/1992 |
| WO | WO 94/04631 | 3/1994 |
| WO | WO 95/17981 | 7/1995 |
| WO | WO 97/18415 | 5/1997 |

* cited by examiner

Primary Examiner—Sean Vincent
(74) Attorney, Agent, or Firm—Oblon, Spivak, McClelland, Maier & Neustadt, P.C.

(57) ABSTRACT

The present invention relates to a vitrification process for a pulverulent material and an apparatus for implementing said process. The process consists in introducing the pulverulent material into the fusion area of a furnace via injection means, where it is melted by means of at least one plasma torch to obtain a melt, and where the melt is removed from the furnace via a casting zone, the material being introduced laterally into the fusion zone in a direction comprising a horizontal component, and the melt being removed from the furnace by overflowing via the said casting zone, more or less along said horizontal component and away from the means for injecting the material into the furnace, in relation to the fusion zone.

35 Claims, 5 Drawing Sheets

PROCESS FOR THE VITRIFICATION OF A PULVERULENT MATERIAL AND APPARATUS FOR IMPLEMENTING THE PROCESS

The present invention has been developed by the Europlasma corporation with funding provided by the City Council of Bordeaux (France) under the aegis of the Socogest (France) corporation, with assistance and technical input provided by the Aerospatiale (France) corporation.

1. Field of the Invention

The present invention relates to a continuous vitrification process for a powdered material and an apparatus for implementing said process.

The process of the invention is designed to render inert by vitrification any type of solid waste or residue, in particular pulverulent (powdered) or particulate materials containing, for example, metals, in particular heavy metals such as mercury, cadmium, lead, etc. and their salts, and asbestos, and generally speaking to render inert by vitrification any pulverulent or particulate material containing heavy metals or other toxic substances that must be destroyed, transformed or trapped for recycling or storage under present or future legislation regarding the treatment and elimination of said toxic waste.

The pulverulent materials may, for example, result from the incineration of household, industrial or hospital waste. Therefore the invention will be described below in its application for rendering inert solid residues from the incineration of household waste, particularly residues composed of boiler dust, fly-ash and filter cake used to neutralize and treat the incineration fumes of such waste.

The process and the apparatus of the present invention also have the advantage of being suitable for integration as a kit into a standard existing incineration center, preferably comprising a system for treating the fumes and gases from waste incineration. The combination of the incineration center and the kit comprising the process and the apparatus of the invention thus constitute a "zero waste" incineration plant.

The incineration of household waste produces two types of effluent: solid waste and gaseous waste or incineration fumes.

The solid waste constitutes the mineral fraction of the waste and is alkaline in character due to the presence of certain metal oxides such as the oxides of alkaline metals, and alkaline earth. This solid waste is boiler dust and clinker. Certain types of clinker are considered non-toxic by the legislation in force and may be used without risk, for example in bitumen, after deferrization. Boiler dust, on the other hand, is a highly toxic pulverulent substance since it contains heavy metals and their salts and, once stabilized, needs careful storage on protected sites with a view to later retreatment.

The gaseous waste is more or less acid in character due to the presence of acidic gases such as Hcl and HF, together with gaseous acid anhydrides such as $SO_2$ and $CO_2$. It also contains toxic ingredients such as heavy metals and their salts and solid incineration residues such fly-ash. This gaseous or fume effluent must be filtered and treated to neutralize its acidity, condense the metals and their salts and trap the fly-ash before it is released into the atmosphere. The wet neutralization of this effluent produces a pulverulent or particulate material that is more or less agglomerated and known as filter cake.

The combination of fly-ash and filter cake comprises the purification residues of household waste incineration fumes known as REFIOM.

This REFIOM and the boiler-dust described above constitute the materials currently considered the "final waste". They contain vitrifiable ingredients such as silica and alumina, metallic salts that are volatile at high temperature and toxic substances such as the heavy metals and their salts mentioned above.

The metallic salts in this waste, the heavy metals and their salts are soluble in water and are easily carried by rainwater to be dispersed in the soil and groundwater tables. The same is true of other substances that are more or less stable over time and more or less soluble, making them subject to dispersal by rainwater.

These substances may thus constitute a major source of pollution, particularly by leaching. The nature and composition of the materials therefore justifies their being classified as solid, mineral, vitrifiable Special Industrial Waste (SIW) and therefore subject to legislation requiring them to be stabilized or stored in special waste storage centers.

At the present time, vitrification would seem the surest way of rendering these materials or final incineration waste inert with a view to storage or recycling.

These materials contain silica and alumina that liquefy to form a melt when subjected to temperatures above 1300° C. When this melt cools it forms a crystalline or solid amorphous vitreous material that acts as an effective trapping matrix for the heavy metals.

2. Prior art

Various processes and techniques have already been developed for vitrifying this type pulverulent material. The techniques mainly differ in the heating means used.

Pulverulent materials are usually vitrified by means of electricity using the Joule effect and an electric arc. Fossil fuel systems using gas or fuel oil have also been developed.

For example, document WO-A-92/15532 describes a vitrification apparatus for treating fly-ash from chemical waste and other materials. The heating mean described in this document are electrodes or a gas burner. The electrodes cause an electric current to pass directly through the ash and chemical waste, causing melting of the materials due to the Joule effect. The gas burner melts the ash by convection.

However, using the Joule effect to heat the material has a large number of drawbacks. It produces an uncontrollable fusion process in which the distribution of heat within the vitrifying material depends on the variable chemical composition of the materials and the temperatures reached are often too low to give a uniform melt. Moreover, this type of heating causes the formation of a non-vitrifiable slag that causes technical problems in the design of the furnace and lowers the quality of the final vitrified product. Additives are often required when using this type of heating in order to overcome these drawbacks; unfortunately, though, these additives have a negative effect on the thermal balance of the melt and increase the cost of the vitrification treatment.

Furthermore, some systems using the Joule effect require additional furnace start-up means when the materials to be vitrified do not conduct electricity when cold.

Document WO-A-95/17981 describes an apparatus for treating fly-ash by means of electric arc vitrification. In this apparatus, the ash is introduced into a furnace via a conduit that constitutes an electrode. Gravity causes the ash to move from the open end of the furnace to the bottom, passing through an electric arc created between the free end of the electrode and the base of the furnace. The ash is thus rapidly heated and melted. The electric arc causes melting due to a combination of the Joule effect, radiation and convection, resulting from the development of the arc, whose trajectory is partly within the ash and partly outside it.

Heating by means of electric arc also has a certain number of drawbacks such as the difficulty of controlling a highly uneven fusion process, technical problems in the design of the furnace due to radiation of the arc and the creation of highly toxic fumes resulting from the formation of carbon/oxygen/chlorine compounds.

Fossil-fuel powered furnaces have the drawback of requiring high combustion gas flow-rates, of often having inefficient rates of heat transmission and producing toxic fumes resulting from the formation of carbon/oxygen/ chlorine compounds.

Using the energy sources described above has the drawback not only of having high energy consumption, giving poor thermal balances of vitrification to obtain the high temperatures required for vitrification, but some of them also causes significant emission of toxic gaseous effluents requiring treatment. Moreover, the vitrified material obtained is not uniform, has numerous structural defects and contains clusters of particles and unmelted pulverulent materials that make the vitrified product obtained fragile and significantly reduce its capacity to resist leaching.

More recently, plasma arc heating processes have been developed for vitrifying pulverulent materials. Plasma arc processes give better control of the energy supplied to the fusion zone, particularly when the mixture of gases in the torch makes it possible to obtain suitable thermochemical conditions.

Because the plasma torch has a wide range of adaptations and uses, it also has the advantage of reducing the quantity of toxic gases formed by thermochemical reactions during the vitrification process.

Patent application FR-A-2 708 217 describes a process for making powdered waste inert using a plasma torch, together with an installation for implementing the process.

The process desc bed in this document consists of introducing pulverulent residues from incinerating household waste and from the incineration fumes of the same waste into a furnace and melting the residues by means of a plasma torch. The melted ash is eliminated from the furnace by gravity.

This process is characterized by the fact that it consists in operating the torch such that the plasma arc is maintained between the residue melt in the furnace and the torch, and that, within a reaction zone between the plasma and the raw substances to be treated, the torch is kept permanently covered by the mass of raw substances. The raw residues to be treated flow into the furnace due to gravity and the lower section of the torch is permanently covered by the said residues and the melted substances flow out of the bottom of the furnace due to gravity.

The process described in this document is used in a fusion process which, when used to treat incineration ash, requires prior dechlorination of the ash to avoid the formation of a coat of salt crystals in the furnace since these salts are prejudicial to the long-term continuous functioning of the furnace.

DISCLOSURE OF THE INVENTION

The present invention relates precisely to providing a process and an apparatus for implementing the process designed to render inert by vitrification a pulverulent material containing toxic compounds, in particular heavy metals and their salts.

In particular, the process and the apparatus of the invention gives effective control over the melting process of a pulverulent material and yields an amorphous vitreous or a crystalline material that meets all the standards applicable to the storage of special industrial waste and its recycling, for example as building materials.

The process of the invention is a continuous process for vitrifying a pulverulent material wherein the pulverulent material is introduced into a fusion zone of a furnace by injection means, where it is melted by means of a plasma torch so as to obtain a melt, and wherein the melt is removed from the furnace via a casting zone, the material being introduced laterally into the fusion zone in a direction comprising a horizontal component, and the melt being removed from the furnace by overflowing via the said casting zone, more or less along said horizontal component and-away from the means for injecting the material into the furnace, in relation to the fusion zone.

The term "injection" has been used in the present description and the attached claims for the sake of convenience. It will readily be understood by reading the various different means for injecting the pulverulent material that can be used according to the process of the invention that this term is not limited to the introduction of pulverulent material under pressure into the fusion zone; it may clearly also include the introduction of pulverulent material without pressure into the fusion zone.

The melt is preferably removed from the furnace by overflowing and drawing in the said casting zone of an amorphous vitreous or crystallized material obtained by cooling of the said melt.

The pulverulent material may be any type of solid waste or residue, in particular pulverulent or particulate materials containing toxic substances for example, metals, for example heavy metals such as mercury, cadmium, lead, etc. and their salts, and generally any pulverulent or particulate material containing metals or other toxic substances that must be made inert by vitrification for storage or possible recycling.

The pulverulent material is composed of particles that may include a wide range of grain sizes, ranging, for example, from 1 $\mu$m to several millimeters, for example up to approximately 1 mm.

The pulverulent material is injected laterally into the fusion zone of the furnace in a direction comprising a horizontal component, said direction possibly also comprising a vertical component oriented downwards, i.e. towards the melt.

According to the process of the invention, the horizontal and vertical components injecting the pulverulent material into the furnace may be adjustable and the pulverulent material may be injected onto the melt or into it. This type of procedure facilitates the initial heat transmission, i.e. as soon as the pulverulent material is injected into the furnace onto the melt or into it, between the melt and the pulverulent material and avoids pulverulent materials escaping from the melt, i.e. for example into the apparatuses for evacuating and/or treating the fumes and gases resulting from the melting of the pulverulent material, or into refractories of the furnace not covered by the melt. The process of the invention thus melts the pulverulent material as it is injected into the fusion zone without excessive build-up of unmelted pulverulent material in the said fusion zone.

When material is injected onto the melt, i.e. onto the surface of the melt, it is done so as to avoid excess pulverulent material or melt straying into the fusion zone that is not covered by the melt.

The pulverulent material is preferably injected into the furnace at an angle of approximately 0 to 90° to the surface of the melt, at a preferred angle of 10 to 45° to the surface of the melt, and preferably into the melt.

According to the process of the invention, injection may be achieved, for example by means of an injector fitted with a screw or pusher, or a pneumatic injector; a pneumatic injector is preferred.

When a pneumatic injector is used, the pulverulent material may be injected in either diluted or dense mode. These diluted or dense modes of conveying or injecting pulverulent material are defined and differentiated by the proportion of solids in the conveying gas used. Generally speaking, a diluted mode is one in which one kilogram of conveying gas carries between 0.01 to 15 kg of solid, and a dense mode is one in which one kilogram of conveying gas carries or injects between 15 kg and 200 kg of solid.

According to the invention, when injection is effected using a pneumatic injector, injection of pulverulent material into the fusion zone may be controlled by controlling the proportion of pulverulent material in the conveying gas and may be achieved with a proportion of 5 to 50 kg of pulverulent material to one kilogram of conveying gas, and preferably 15 to 30 kg of pulverulent material to one kilogram of conveying gas; this latter proportion is described as dense mode pneumatic injection.

Dense mode pneumatic injection according to a preferred embodiment of the process of the invention can give injection of pulverulent material that is virtually continuous, discontinuous, undulating or pulsed, or in piston mode, depending on the rate of injection. This type of injection limits the amount of pulverulent material fly-off from the melt, i.e. for example into the apparatuses for evacuating and/or treating the fumes and gases and makes it possible to optimize the thermal balance of the melting pulverulent material while limiting excessive conveying gas flow rates and avoiding dispersal of the material outside the melt.

According to the process of the invention, injection of pulverulent material into the fusion zone may be controlled by setting the rate at which the pulverulent material is injected. This setting is variable and may be dependent, particularly, on the volume of the melt in the fusion zone of the furnace, the level of the melt in the fusion zone and the casting zone, on the power rating of the torch, of the overflowing and drawing outside the furnace, and the nature of the pulverulent material.

Controlling the injection of pulverulent material by setting the vertical and horizontal pulverulent material injection components and/or by setting injection onto or into the melt and/or by setting the proportion of pulverulent material in the conveying gas in pneumatic injection and/or by setting the rate of injection into the fusion zone of the furnace must be effected so as to avoid dispersal and/or accumulation of unmelted pulverulent material in the fusion zone in order to optimize the aforementioned initial heat transmission between the injected material and the melt in order to avoid fly-off of pulverulent material in the fusion zone and preferably to give the melt a movement more or less in the direction of the horizontal pulverulent material injection component in the furnace.

The pulverulent material is injected into a fusion zone where it is melted by means of a plasma torch to obtain a melt.

The fusion zone is preferably cylindrical in shape but may have any other shape, e.g. elliptical, oblong, rectangular, etc. suitable for the process of the present invention.

When the fusion zone includes refractories, they should preferably be chrome-free in the fusion zone in contact with the melt in order to avoid any contamination with hexavalent chrome of the vitreous or crystallized material obtained by the process of the invention.

The fusion zone and casting zone refractories may for example, be alumina-based.

According to the process of the invention, the plasma torch is preferably a non-transferring arc plasma torch. Examples of this type of torch are described, for example, in patent applications FR-A-2 735 941, FR-A-2 735 940 and FR-A-2 735 939.

According-to the process of the invention, one or more plasma torches may be used.

According to the process of the invention, the plasma torch may be replaced by any heating means suitable for the process of the present invention.

The plasma torch is a device which provides a flow of air at a high temperature of the order of 4000° C. by heating the air by means of a DC electric arc. At this temperature the air is partially ionized, which is characteristic of plasma. The non-transferring arc plasma torch is further characterized by the fact that the electric arc is inside the plasma torch and that the plasma created flows out of the torch.

The air used in this example may be replaced by other plasmid gases such as oxygen or oxygen-enriched air.

An advantage of using a plasma arc torch as the heating means and of choosing a plasmid gas, i.e. air or oxygen according to the process of the present invention is that the oxygen provided by the torch converts heavy metals into oxides with high melting points giving a good heavy metal trapping rate.

Another advantage of using a non-transferring arc plasma torch according to the process of the invention is that it gives plasma flows in which the temperature of the melt is below 2500° C., thereby limiting evaporation of heavy metals.

A further advantage of using a non-transferring arc plasma torch is described in the examples.

According to the process of the invention, the non-transferring arc plasma torch is directed downwards to give a flow of plasma that is more or less central to the melt in the fusion zone. This centralized flow limits the risks of the melt splashing the walls of the furnace, thereby causing areas of premature wear.

According to the invention, the power rating of the plasma torch as well as its height and angle of incidence relative to the surface of the melt can be controlled.

According to the process of the invention, the non-transferring arc plasma torch is directed downwards and its angle of incidence may be controlled so that the plasma flows more or less in the direction in which the pulverulent material is being injected. This angle may be approximately 45 to 900 relative to the surface of the melt, 90°0 being a vertical downward flow of the plasma created by the torch.

The power of the plasma flowing into the fusion zone may be controlled to obtain a melt at a preferred temperature of between 1300 and 1500° C. The power rating of the plasma torch and its height in the fusion zone is controlled relative to the volume of the melt and its height in the fusion zone; this is both to protect the refractories near the plasma flow and to optimize heating. It is also controlled relative to the injection of pulverulent material, the drawing of the melt and the temperature of the melt.

The temperature of the melt must be high enough to cause complete melting of the pulverulent material injected into the furnace; however, it should not be too high in order to optimize the thermal balance of fusion of the pulverulent material and to avoid wasting energy. This temperature also depends on the pulverulent material.

The aforementioned injection of pulverulent material is independent of the plasma flow so that the material is trapped in the melt as soon as it makes contact with it without being diverted by the plasma flow, thereby limiting residual fly-off of unmelted of particles onto the uncovered walls of the furnace or, for example, into the apparatuses for trapping the fumes and gases and for melting the material.

When the process of the invention is embodied using a transferring arc plasma torch, and when the pulverulent material does not conduct when cold, the transferring arc plasma torch may be coupled with or assisted by a non-transferring arc plasma torch which melts the pulverulent material at the beginning of the process, the transferring arc plasma torch subsequently operating alone.

The process of the invention produces a low-viscosity melt of the pulverulent material. Due to the low-viscosity of the melt, the highly viscous plasma flow distorts the surface of the melt. This distortion may cause a depression of approximately 10 cm in the surface of the melt compared to the undistorted level of the melt. This distortion has the following effects: heat transmission is improved due to the increased surface area between the plasma and the melt, and hydrodynamic movements are created in the melt that improve its uniformity and thus the quality of the vitrified material obtained.

One of the original features of the process of the present invention is that it uses the impact of the flowing plasma provided by the non-transferring arc plasma torch.

According to the process of the invention, the fusion zone in contact with the melt may be cooled, for example by means of a water-operated cooling circuit cooling the fusion zone in contact with the melt, giving operation in protective auto-crucible mode designed to increase the service life of the refractories submerged in the furnace melt.

According to the process of the invention, an auto-crucible made of a material compatible with the refractory materials of the fusion zone and the casting zone, i.e. non-corrosive, and having the same characteristics at high temperatures as said refractory materials, may also be formed in the furnace. Said compatible material may, for example, have a melting-point higher than that of the pulverulent material injected into the furnace so that it remains solid while the pulverulent material is melted. This material may, for example, be a mixture of $Al_2O_3$, CaO and $SiO_2$.

An auto-crucible is designed to limit the chemical corrosion of the refractories of the fusion zone covered by the melt by limiting the migration of corrosive materials at high temperature into the refractory wall and fixing them there.

The melt obtained is removed from the furnace via a casting zone by overflowing into the said casting zone, more or less in the direction of the horizontal component along which the pulverulent material is injected into the furnace and in the opposite direction to the means of injecting the material into the furnace relative to the aforementioned fusion zone.

Injection of the pulverulent material is therefore more or less in the opposite direction to the flow of the melt out of the furnace. In particular, this arrangement makes it possible to control the time the material spends in the furnace and to homogenize the melt.

According to the process of the invention, the melt overflowing via the casting zone of the furnace outside the furnace is cooled by cooling means, for example cooling screens placed outside the furnace along the path taken by the melt under the influence of gravity.

According to the process of the invention, overflow of the melt may be controlled, for example by setting the overflow level of the melt by, for example, a movable, adjustable overflow stop placed at the end of the casting zone of the furnace facing the fusion zone, i.e. where the melt flows out of the furnace.

According to the process of the invention, the melt overflowing from the casting zone may be drawn into a vitrified material.

This drawing of the melt may be effected by, for example, a rolling mill with cooled rollers that continuously draws the melt from the furnace casting zone outside the furnace and cools it into a vitrified or crystalline material.

An advantage of the process of the invention when the melt is drawn by means of a rolling mill with cooled rollers is that it is possible to modify the dimensions of the vitrified material by setting the distance between the drawing rollers as well as their shape, making it possible to adapt the shape of the vitrified materials to the sector for which they are being recycled. Another advantage of the process related to coupled drawing and cooling, for example using a rolling mill with cooled rollers, is that the cooling of the rollers can be controlled to affect the vitrification or crystallization process depending on the mechanical characteristics required for the vitreous or crystallized material obtained.

Drawing of the melt is effected at a given drawing speed or a given overflow speed, relative to the level of the melt in the casting zone, and therefore to the level of melt in the fusion zone and to the injection of pulverulent material, so as to maintain more or less constant the level of the melt in the fusion zone. Controlling the drawing speed of the melt should make it possible to optimize the melting process of the pulverulent material by controlling the time the material stays melted inside the furnace so that the end result is a vitreous material that is dense and uniform and includes no clusters of unmelted pulverulent material and avoids wasting energy.

According to the invention, the fusion zone of the pulverulent material may be maintained under slight negative pressure by any known means, for example by means of a gas and fume extraction ventilator together with a register positioned in the casting zone of the melt. This slight negative pressure helps eliminate leakage of gas and fumes, which may be toxic, outside the furnace via leaks in the furnace or via the casting zone where the melt overflows.

According to the process of the invention, the level of the melt in the fusion zone is preferably constant in the fusion zone and, for example, preferably of the order of 100 to 500 mm where the process only used one torch and the diameter of the fusion zone is approximately 1500 mm, preferably 300 mm.

Moreover, for example, in a furnace with a diameter of approximately 1500 mm, a torch height of 450 to 950 mm relative to the surface of the melt and a fusion zone height of 500 to 1500 mm is preferred, the injection rate of the pulverulent material according to the process of the invention may be controlled to a rate of 100 to 700 kg of material per hour, preferably between 300 and 700 kg of pulverulent material per hour. Furthermore, with these dimensions and injection rate, the power rating of the plasma torch may be controlled to approximately 150 to 700 kW for a torch height of approximately 450 to approximately 950 mm.

According to the process of the invention, the time the material remains melted inside the furnace, counting from injection of the pulverulent material until overflow and/or drawing, is preferably at least 30 minutes and preferably approximately 60 minutes.

According to the process of the invention, injection of the pulverulent material into the furnace may be controlled by controlling the vertical and horizontal pulverulent material injection components and/or by controlling injection onto or into the melt and/or by controlling the injection rate and/or by controlling the proportion of material in the conveying gas. The plasma torch may be controlled by setting its height in the fusion zone and thus by controlling the height at which the plasma flows onto the melt, by setting the angle of the torch in the furnace and by setting the power rating of the torch. The overflow of the melt may be controlled, for example, by adjusting a movable, adjustable stop, and the drawing of the melt may be controlled by, for example, setting the speed at which the melt is drawn; this may be coupled with controlling of the cooling of the melt drawing means.

According to the process of the invention, the injection of pulverulent material into the furnace, the plasma torch and drawing of the melt are preferably controlled.

The settings according to the process of the invention, may, for example, be designed to maintain a more or less constant level of melt in the fusion zone and/or the casting zone by controlling the injection of pulverulent material into the furnace and drawing of the melt.

The level of the melt in the casting zone may be maintained at a constant level by means, for example, of a control loop controlling the level of the melt. This control loop may take as its basic datum an optimal value for the level of the melt in the casting zone. Three ranges of melt may, for example, be defined:

- a high range in which the level of the melt in the casting zone is too high. The value of the melt level in this high range commands, by means of said control loop, the overflow means, for example control of an overflow stop and/or the drawing speed of the melt, for example the rotation speed of the rollers of a rolling mill; the higher the level, the higher the overflow, i.e. the lower the overflow stop, and/or drawing of the melt, i.e. the faster the rotation speed of the rollers of the rolling mill. The injection of pulverulent material, however, remains constant.
- a medium range in which the level of the melt in the casting zone is more or less at the optimal level required for an optimal fusion process in the fusion zone resulting from a balance between injection of the pulverulent material into the furnace and drawing of melted material outside the furnace. Overflow and/or drawing and injection speeds are maintained constant by means of this control loop and as defined for the melt level required for an optimal fusion process in the fusion zone.
- a low range in which the level of the melt in the casting zone is too low. The value of the melt in this range commands, by means of said control loop, the quantity of pulverulent material injected; the lower the level of the melt, the more the quantity of pulverulent material injected increases; in this low level range, the overflow and/or drawing speed remain constant and as initially defined for the optimal fusion process in the fusion zone.

The level of the melt in the casting zone and/or the fusion zone can be determined using a melt level probe, for example photoelectric cells, a floater, etc.

Controlling the injection rate of pulverulent material into the furnace, the power rating of the plasma torch and the drawing of the melt all serve to optimize the fusion process and ensure a uniform melt free from clusters of unmelted pulverulent material and yielding a uniform high-quality vitreous material while controlling the time residues remain in the fusion zone, giving a controlled, optimal thermal balance.

The settings according to the process of the invention may, for example, be designed to maintain more or less constant the temperatures of the melt and the casting zone by controlling the injection of pulverulent material into the furnace and the power rating and/or the height of the plasma torch.

The temperatures of the melt and the casting zone may be maintained more or less constant by means, for example, of a control loop controlling these temperatures. This control loop may take as its basic datum an optimal value for the temperature of the melt in the casting zone.

The aim of this setting is to control by means of said control loop the power rating of the non-transferring arc plasma torch relative to the rate at which pulverulent material is injected into the furnace, to the temperature of the melt in the casting zone and to the temperature of the casting zone. The power rating of the torch must be sufficient to compensate for loss of heat in the furnace and to melt all the pulverulent material injected.

The temperature of the melt may be determined by means of temperature probes located within and/or above the melt in the fusion zone and/or in the casting zone of the furnace.

Several situations are possible, for example, if the temperatures of the melt and the casting zone are too high, i.e. above the optimal temperature required, the control loop commands a reduction in the power rating of the torch; if the temperatures of the melt and the casting zone are too low, i.e. below the optimal temperature required, the control loop commands an increase in the power rating of the torch; if the temperature of the melt is too low and the temperature of the casting zone is too high, the control loop commands, for example, a warning system. In this situation the setting can command a reduction in the power rating of the torch and startup of heating means located, for example, in the melt drawing means, together with an increase in the injection rate of pulverulent material and the drawing of the melt.

The settings according to the process of the invention may, for example, be designed to maintain the fusion zone at a more or less constant temperature by controlling the height of the plasma torch.

The temperature of the fusion zone may be maintained at a more or less constant temperature, for example by means of a control loop controlling the temperature of the fusion zone.

The aim of this setting is to control by means of said control loop the torch/plasma heat transmission without causing stress in the furnace refractories covered by the melt. The parameters operating in this setting are the power rating of the torch (normally controlled relative to the injection rate of pulverulent material), the temperature of the fusion zone covered by the melt, measured, for example, by means of temperature probes placed in or on one wall of the furnace, preferably in the region of the fusion zone more less at the point from which the plasma flows from the torch, and the height of the torch relative to the melt in the fusion zone, for example, at a given plasma torch power rating; the height of the torch relative to the melt surface is controlled to optimize the transfer of energy to the melt while avoiding overheating the furnace wall covered by the melt at the point from which the plasma flows.

The settings and control loops governing injection, the torch and the overflow and/or drawing of the melt according to the process of the invention are preferably used simultaneously.

Since, according to the process of the invention, melting of the pulverulent material causes production of fumes and gases, the said fumes and gases are extracted from the furnace at high temperature.

The gases produced may, for example, include dioxins, furans and heavy metal salts.

The process according to the invention has a further advantage related to the use of a non-transferring arc plasma torch and thus an "open bath" configuration that allows fumes and gases to be extracted easily at high temperature.

Moreover, according to the process of the invention, the fusion zone may be may be maintained under slight negative pressure relative to atmospheric pressure, for example by means of an extraction ventilator for treating fumes and a register partially separating the fusion zone from the casting zone to eliminate toxic gases being expelled into the atmosphere.

According to the process of the invention, these fumes and gases are extracted at approximately 1500° C., which eliminates condensation of corrosive salts on the walls of the furnace; these salts can be prejudicial to the long-term industrial operation of the process. Due to the time the melt remains in the fusion zone (approximately 2 seconds at this temperature), the dioxins and furans are decomposed and remain so.

The fumes and gases extracted from the furnace are collected and quenched, for example using water, the water acting to cool the fumes and gases at the furnace outlet, in a quenching apparatus. This prevents the dioxins and furans from reforming.

According to the process of the invention, the fumes and gases extracted may be treated and neutralized in a standard system for the treatment of gaseous waste such as that used in waste incineration plants.

Moreover, the process of the invention may be used on line with an existing standard process for the incineration of household waste and the fumes and gases resulting from the process of the invention may be treated on line with a standard process for the treatment of gaseous waste, for example the said household waste incineration process.

According to the process of the invention, one or more additives may be injected into the furnace at the same time as the pulverulent material. These additives may, for example, be designed to increase fluidity and slip of the melt in the furnace, to give better melt uniformity, or to facilitate the formation of the vitreous matrix, or a mixture of these additives.

The present invention also relates to an apparatus for implementing the process of the invention described above.

The apparatus of the invention is an apparatus for the continuous vitrification of a pulverulent material comprising a furnace having a pulverulent material fusion zone and a casting zone for the melted material, at least one means for injecting pulverulent material, at least one plasma torch, and at least one means for overflowing the melt, said means for injecting pulverulent material being lateral to the fusion zone of the furnace and directed in one of the injection directions comprising a horizontal component, said casting zone or zones being oriented more or less along said horizontal component and more or less away from the said injection means, in relation to the fusion zone, said casting zone or zones being overflow zones of the said fusion zone and comprising a first and a second end, the first end(s) of the said casting zone or zones being in contact with the fusion zone, the second end(s) of the casting zone being in contact with the melt overflow means, said overflow means being positioned to give overflow of the melt in one of the more or less horizontal directions.

According to the invention, the apparatus also comprises one or more means for drawing the melt coupled to the melt overflow means.

According to the invention, the plasma torch is preferably a non-transferring arc plasma torch.

According to the invention, the fusion zone of the furnace may be of any shape suitable for the process of the present invention, e.g. elliptical, oblong, rectangular, circular, etc., but is preferably cylindrical, the melt being preferably located in a circular section of the cylindrical shape.

The fusion zone may comprise refractories that are preferably made of alumina, those in the fusion zone and covered by the melt being chrome-free, chrome causing hexavalent chrome contamination of the melt at high temperatures and contamination of the gases and fumes given off as the pulverulent material starts to melt. The refractories in the fusion zone that are not covered by the melt, i.e. subjected to stress by the gases and fumes given off as the pulverulent material starts to melt, may be constructed from alumina and may contain a small quantity of chrome to improve their heat resistance, particularly to thermal shock. Said refractories preferably have a multi-layer structure.

According to the apparatus of the invention, the injection means may, for example, be a pneumatic injection apparatus, or fitted with a screw or pusher. The injection means is preferably a pneumatic injection apparatus.

According to the invention, said injection means is preferably -disposed laterally to the fusion zone of the furnace and directed in an injection direction comprising a horizontal component, and may also comprise a vertical component oriented downwards.

For example, the injection means is disposed so that it injects the pulverulent material at an angle of 0 to 90° relative to the surface of the melt, and preferably at an angle of 10 to 45° relative to the surface of the melt.

According to the invention, the injection means may, for example, extend into the fusion zone in the form of a lance that has the shape of a metal tube protected by a refractory. The injector may be adjustable to inject pulverulent material either into or onto the melt.

The lance for injecting pulverulent material into the furnace preferably has an internal diameter in the furnace related to the material injection rate. For example, for an injection rate of 350 kg/hour of pulverulent material, as described in the example of an embodiment of the present invention, the internal diameter of the lance may be 20 mm.

The injection means according to the invention may be adjustable as concerns the pulverulent material injection rate and/or the proportion of material in the conveying gas and/or the vertical and/or horizontal pulverulent material injection components, and/or injection onto the surface of the melt or into the melt itself.

The apparatus of the invention may comprise one or more transferring arc and/or non-transferring arc plasma torches.

When the pulverulent material does not conduct electricity when cold a transferring arc plasma torch may, for example, be coupled to a non-transferring arc plasma torch, the latter being used to initiate the fusion process.

These plasma torches may, for example, be replaced or complemented by heating by means of a burner.

The plasma torch is preferably protected by a sheath made of refractory material. This refractory sheath acts to limit loss of heat related to the transmission between the refractory walls at high temperature and the cooled torch, and thus to avoid recondensation of salts produced during fusion of the pulverulent material on the cold surface of the torch. This type of recondensation makes withdrawal of the torch for maintenance and/or emergency reasons more difficult.

The torch may be mounted on a movable bracket allowing it, for example, to be moved vertically and/or horizontally, thereby optimizing its position relative to the melt.

According to the apparatus of the invention, the plasma torch can be controlled as concerns its power rating, its height relative to the melt and its angle relative to the surface of the melt.

For example, for a furnace fusion zone diameter of approximately 1500 mm, a pulverulent material that melts at between 1300 and 1500° C., and a melt depth of between 100 and 500 mm, the power rating of the plasma torch may be set to between 150 and 700 kW and preferably approximately 600 kW, the height of the torch may be set to between 450 and 950 mm above the melt, and preferably 700 mm, and the angle of the plasma torch may be set to between 45 and 90°, and preferably 90°.

According to the apparatus of the invention, the overflow means of the melt may, for example, be an overflow stop disposed on the second end of the casting zone. This overflow stop may be movable and adjustable so as to allow the overflow level of the melt to be set.

According to the apparatus of the invention, the overflow means may be coupled with cooling screens to cool the melt overflowing out of the furnace as vitreous or crystallized material.

According to the invention, the overflow apparatus may be replaced by, or coupled with, means for drawing the melt.

According to the apparatus of the invention, the drawing means may, for example, be a rolling apparatus or rolling mill with cooled rollers.

This type of rolling mill has the advantage of allowing the melt drawing speed to be controlled by controlling the rotation speed of the rollers; the rotation speed of the rollers may, for example, be coupled to a system for cooling the rollers. Thus, when the drawing speed of the melted material is high, the roller cooling control system commands greater cooling of the rollers, thereby giving vitreous material of constant quality.

Moreover, a rolling mill has the advantage of being able to guide and calibrate the crystalline or vitreous material being formed.

In one embodiment of the invention the casting zone may comprise a register that separates the fusion zone from the casting zone such that the furnace is maintained under negative pressure. This negative pressure is obtained, for example, by means of an extraction ventilator for the treatment of fumes and gases given off as the pulverulent material starts to melt. This negative pressure prevents the toxins contained in the fumes and gases given off as the pulverulent material starts to melt being discharged into the atmosphere via the casting zone or leaks in the furnace. The register may be fixed or movable.

The register may also provide a regular melt flow-rate at the furnace outlet.

According to the apparatus of the invention, the furnace may also comprise a flue for extracting the fumes and gases given off as the pulverulent material starts to melt. This flue is preferably disposed so that it extracts the fumes and gases without being in contact with the melt either in the fusion zone or the casting zone of the furnace.

The extraction flue may, for example, be connected to the aforementioned extraction ventilator.

According to the apparatus of the present invention, the pulverulent material injection means, the plasma torch and the melt drawing means are controlled by at least one control loop.

For example, the means for injecting pulverulent material into the furnace and the melt drawing means and/or the overflow means may be controlled by a control loop controlling the level of the melt in the furnace.

The control loop of the melt level in the furnace, i.e. in the fusion zone and/or the casting zone of the furnace may, for example, consist of a control system commanding the injection of pulverulent material into the furnace and/or the overflow setting of the melt of the fusion zone and/or the setting of the drawing of the melt out of the furnace in relation to the melt level in the fusion zone and/or the casting zone of the furnace.

The melt level may be determined by means of probes located in the fusion zone and/or in the casting zone of the melt.

For example, when the level of the melt in the casting zone is higher than a preset value the control loop can command faster drawing of the melt, for example when drawing is effected by means of a rolling mill, by increasing the speed of the rollers, while leaving the injection rate of pulverulent material constant.

For example, when the level of the melt in the casting zone is lower than a preset value, the control loop may command a faster injection rate of pulverulent material into the furnace and a constant melt drawing rate.

For example, when the level of the melt is more or less constant and equal to the preset value, the control loop may command constant injection and drawing speed rates.

The means for injecting pulverulent material into the furnace and the power rating of the torch may be adjusted by a control loop controlling the temperatures of the melt and the casting zone.

The melt temperature control loop may, for example, consist of a control system that controls the setting of the rate of injection of pulverulent material into the furnace and plasma torch power setting relative to the temperature of the melt and/or the casting zone.

The temperature of the melt may be determined by means of probes located in the fusion zone and/or the casting zone covered by the melt.

For example, when the temperature of the melt is too high, the control loop may command a drop in the power rating of the torch; conversely, when the temperature of the melt is too low, the control loop may command an increase in the power rating of the torch.

The height of the torch in the furnace may be controlled by a control loop setting the temperature of the fusion zone.

The fusion zone temperature control loop may, for example, consist of a control system for commanding the height setting of the torch relative to the temperature of the casting zone.

The temperature of the fusion zone covered by the melt may be determined by means of temperature probes located in or on one wall of the furnace covered by the melt, preferably near the point on the torch from which the plasma flows.

For example, when, in a situation in which the torch power rating and pulverulent material injection rate are constant, the temperature probes detect a fusion zone temperature higher than a preset value, the control loop can command a greater torch height.

The control loops controlling the level of melt in the furnace, the temperature of the melt and the casting zone, and the temperature of the fusion zone may be used separately or simultaneously. They are preferably used simultaneously.

The apparatus of the invention may be used as described above or on line, for example with a household waste incineration plant, i.e. it may be integrated into a household waste incineration plant preferably comprising means for treating gaseous effluent produced by the incineration of household waste.

In this configuration the apparatus according to the invention can be used for on-line treatment of the pulverulent material produced by incinerating household waste and the fumes and gases given off by the fusion of the pulverulent material are treated on line using an apparatus for the treatment of gases and fumes of the said household waste incineration installation.

The characteristics and advantages of the present invention will be better understood from the following detailed description. The description is of a non-limitative example and refers to the attached figures.

DETAILED EXAMPLE OF AN EMBODIMENT OF THE INVENTION

In FIGS. 1 to 4, identical part numbers refer to identical components of the illustrated embodiment of an apparatus according to the present invention.

Figure 1:
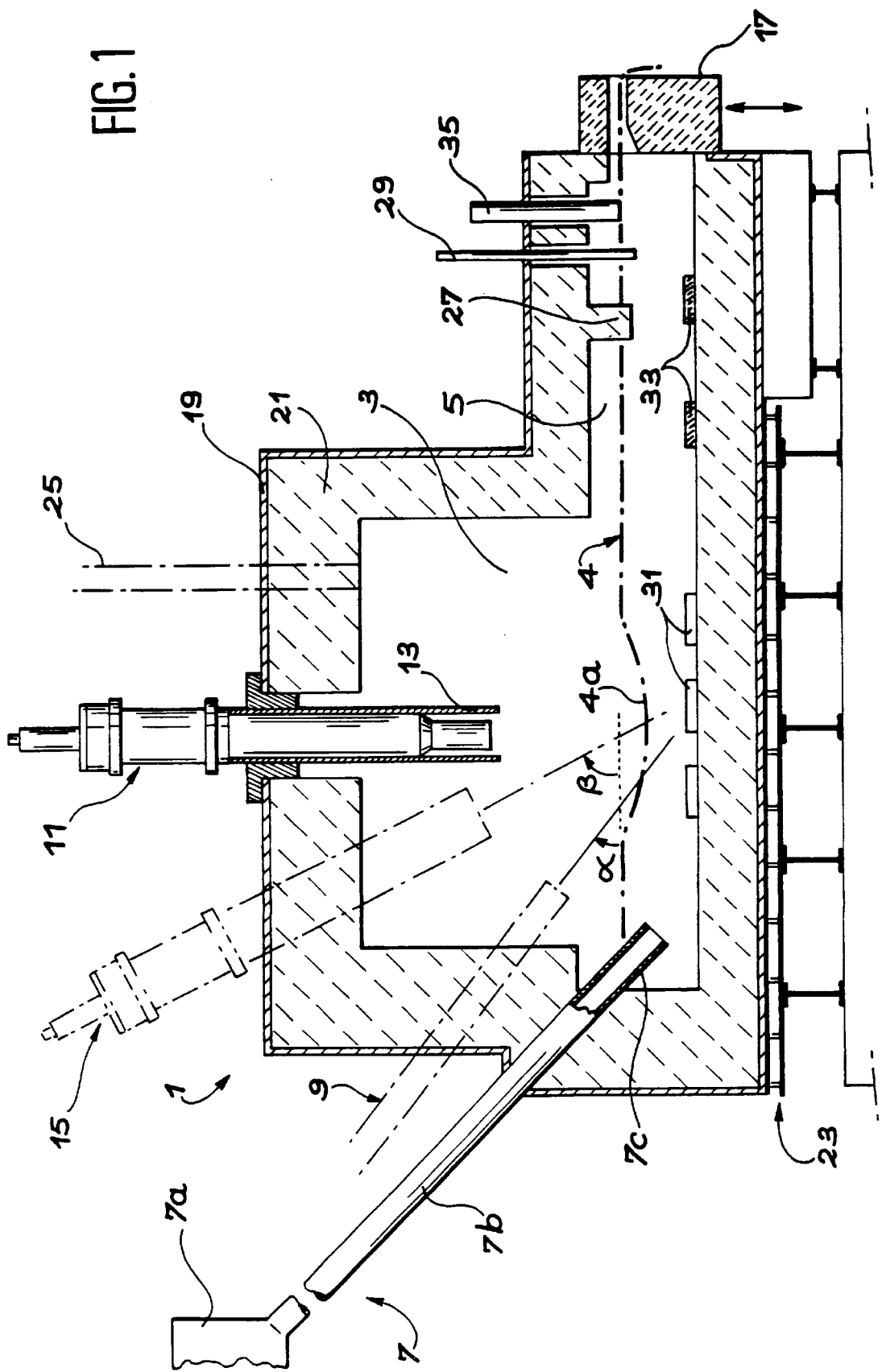
FIG. 1 is a detailed diagram of a cross-section through a continuous vitrification apparatus for pulverulent material according to the invention.
Figure 2:
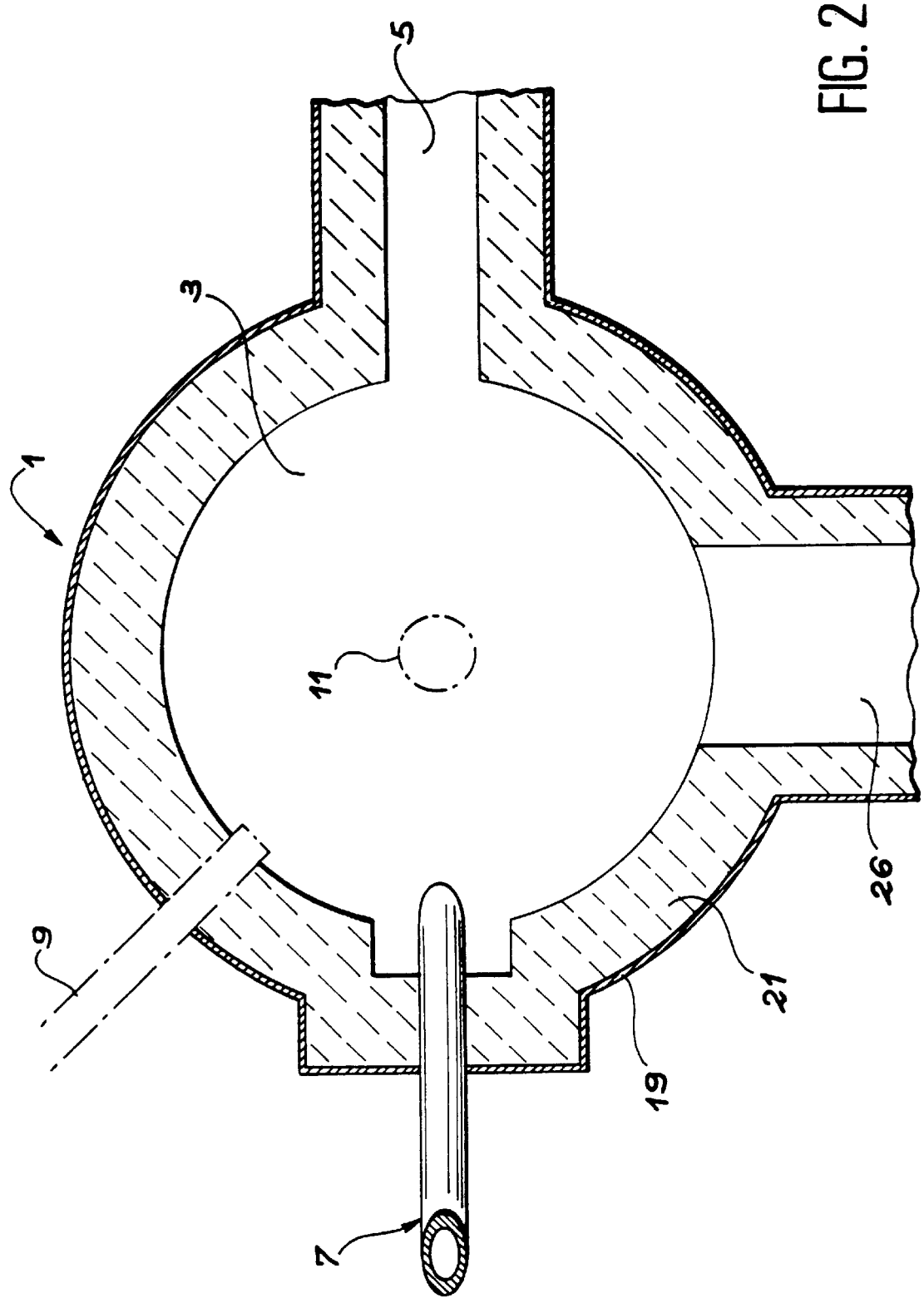
FIG. 2 is a diagram of a top view of a section of a continuous vitrification apparatus for pulverulent material according to the invention.

FIGS. 1 and 2 show respectively a diagram of a cross-section and a top view of a section of an apparatus for implementing an embodiment of the process of the invention.

In these figures, the apparatus comprises a furnace 1 comprising a fusion zone 3 for a pulverulent material and a casting zone 5 for a melt 4. The apparatus also comprises means 7 for injecting the pulverulent material into the furnace, a non-transferring arc plasma torch 11 and melt overflow means 17.

Fusion zone 3 is circular and enclosed by a wall composed of an outer metal envelope 19 and an inner multi-layered refractory structure 21 composed chiefly of alumina. The refractories in contact with the melt together with those likely to come into contact with it are chrome-free to avoid contamination with hexavalent chrome of the said melt and the water used to treat fumes given off as the pulverulent material starts to melt.

The refractories that are not in contact with the melt may contain a small quantity of chrome to improve their heat resistance, particularly to thermal shock.

In order to limit chemical corrosion of the refractories of fusion zone 3 in contact with melt 4, a thermal barrier is created by installing a water-based cooling circuit 23. This thermal barrier causes formation of an auto-crucible in melt 4. This limits migration of corrosive materials into the refractories by trapping them in the auto-crucible.

The internal diameter of fusion zone 3 is 1500 mm and the height of fusion zone 3 is 950 mm.

Fusion zone 3 in contact with melt 4 is described as the vessel, the lateral sides of the furnace are described as the walls and the upper section of the furnace is described as the vault.

Injection means 7 is a pneumatic injector 7a and injection of the pulverulent material is effected with a conveying gas in dense mode. Injector 7a is extended by means of a metal tube 7b or lance that conveys the pulverulent material into the furnace. This lance 7b is protected inside the furnace by a refractory 7c.

Injection means 7 can be controlled so that pulverulent material may be injected either into or onto melt 4 and can be directed in an injection direction comprising variable horizontal and vertical components that can be oriented downwards.

In FIGS. 1 and 2, reference 7 indicates a nominal position for the injection of pulverulent material into melt 4 and reference 9 indicates an example of an alternative position for injecting pulverulent material onto melt 4. Angle α of FIG. 1 indicates the alternative direction for injecting pulverulent material into the fusion zone relative to the surface of melt 4 shown by a horizontal dotted line. This alternative direction angle a is less than the nominal injection direction angle (not shown) of injection means 7.

Apparatus 1 also comprises a non-transferring arc plasma torch 11. This torch is of the type described in patent applications FR-A-2 735 941, FR-A-2 735 940 and FR-A-2 735 939. This plasma torch comprises a cooling apparatus (not shown) and a refractory sheath 13. Refractory sheath 13 acts to limit heat loss due to temperature transfer between the refractory walls of the furnace at high temperature and the cooled plasma torch. The refractory sheath therefore acts to improve the overall energy balance of the process of the invention.

This refractory also acts to avoid recondensation of salts from gases and fumes produced during the fusion process on the cold surface of the torch, which could make withdrawal of the torch for maintenance and/or emergency reasons difficult.

Torch 11 is mounted on a bracket allowing it to be moved vertically, thereby optimizing heating by controlling its position relative to the melt.

In FIG. 1, angle β is the angle of an alternative position of the non-transferring arc plasma torch relative to the vertical position described above, according to a modification of the process of the invention.

In addition to the plasma torch, the apparatus described may include booster burners (not shown) mounted on the lateral sides or walls of the furnace. These burners are used alternatively and may be used to maintain the furnace at a constant temperature during shutdown phases in the process. This is to avoid thermal shocks to the refractories and maintain the pulverulent material melted, thereby allowing the procedure to be restarted immediately.

Casting zone 5, which is on the other side of fusion zone 3 from injection means 7, is a zone in which melt 4 overflows from said fusion zone 3. Said casting zone 5 comprises a first and a second end, the first end of the casting zone 5 being in contact with fusion zone 3, the second end of the casting zone being in contact with overflow means 17 for melt 4.

Melt overflow means 17 is a movable stop that can be adjusted vertically. It is used to control and adjust the overflow level of melt 4 in the fusion zone and the casting zone.

Said melt overflow means may be replaced and/or complemented by a rolling mill with cooled rollers that draws the melt from the furnace via this casting zone. This type of rolling mill is shown as reference 37 in FIG. 3. In this figure the casting zone 5 is coupled to movable, adjustable overflow means 17 for melt 4 and to rolling mill 37. Said rolling mill 37 comprises cooled rotating rollers 39 that draw melt 4 overflowing from the overflow means via the casting zone out of the furnace.

Figure 3:
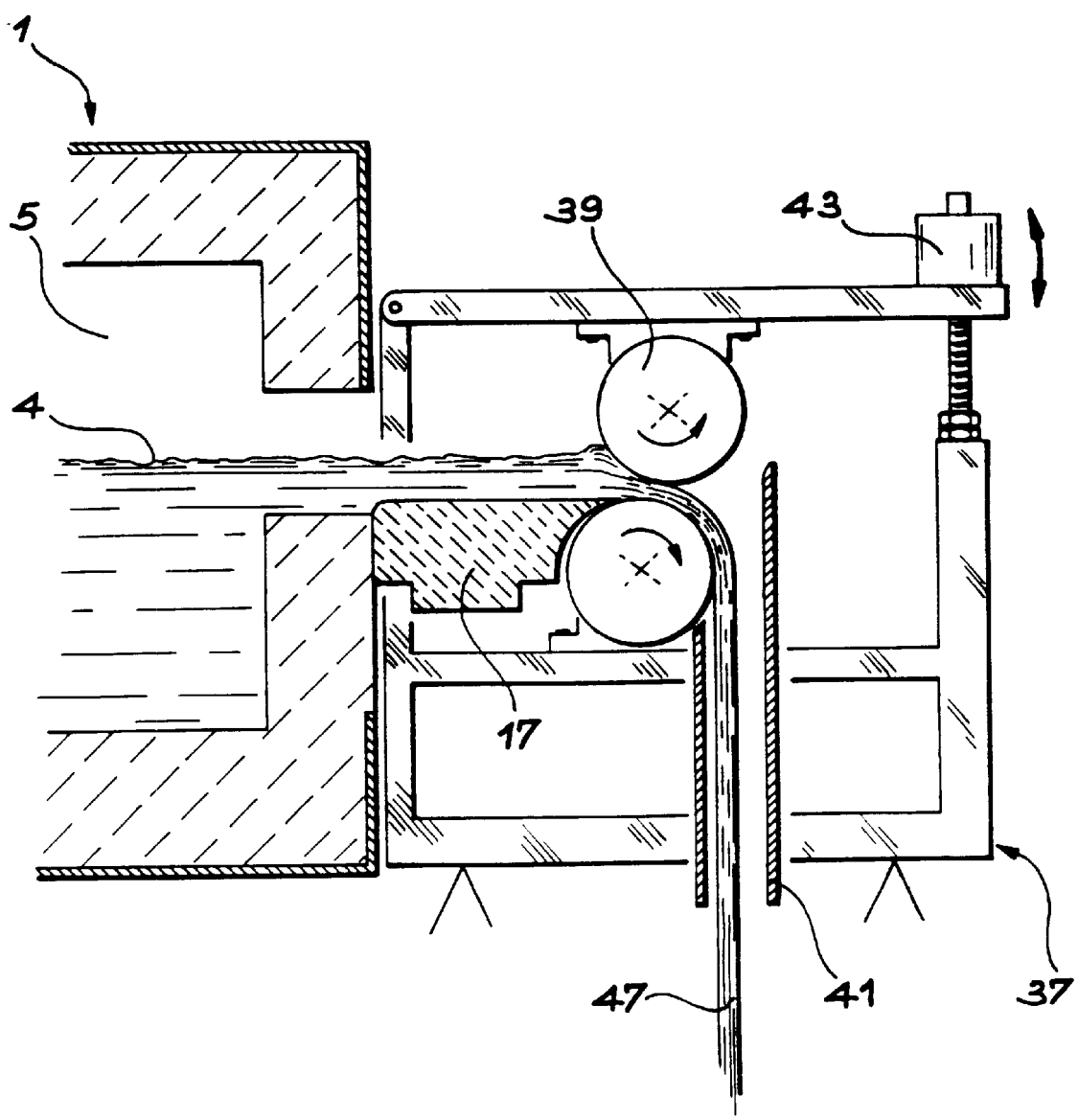
FIG. 3 is a diagram of an enlargement of a section through melt drawing means according to the invention.

The apparatus shown in FIG. 3 also comprises cooling screens 41 that assist in the transformation of the melt 4 by cooling it into amorphous vitreous 47 or crystallized material, and an apparatus 43 for controlling the height of the rolling mill and the overflow stop. In addition, the rotating rollers can be controlled both as concerns their speed and their cooling, thereby making it possible to control the drawing of the melt.

In FIG. 1, the casting zone of apparatus 1 also comprises a register 27 that separates the fusion zone from the casting zone so as to maintain a level of negative pressure in the furnace by means of a ventilator (not shown) for extracting the gases and fumes given off as the pulverulent material starts to melt, via duct 25.

The inventors have also noted that this register helps eliminate unmelted pulverulent material by forcing the heat exchanges between the melt and the unmelted material. It therefore makes a contribution to the quality of the final vitrified product.

The apparatus also comprises a temperature probe 29 used to control the temperature of the melt in the casting zone, temperature probes 31 used to control the temperature of the refractories covered by the melt in the fusion zone more or less in the region where the plasma flows out of the torch, temperature probes 33 located in the casting zone and a melt level probe 35 in the casting zone. The melt level probe operates without contact using the capacitive effect.

In FIG. 1, reference 4a denotes distortion of the surface of the melt in the fusion zone caused by the flow of plasma from the plasma torch. This distortion helps increase the heat exchange surface between the plasma and the melt and improve the uniformity of the melt in the fusion zone.

The apparatus shown in FIG. 1 also comprises three control loops (not shown), X, Y and Z.

A first control loop, known as loop X, controls the melt level in the furnace. This control loop is designed to control means 7 for injecting pulverulent material into furnace 1, melt overflow means 17 and drawing means 37 for the melt in the furnace relative to the level of melt 4 in casting zone 5. Control loop X operates by receiving data concerning the level of melt 4 collected by melt level probe 35 and, in the light of this data, selecting a higher or lower injection flow rate of pulverulent material by controlling injection means 7, and/or a higher or lower melt overflow by controlling the position of overflow stop 17, and/or a higher or lower drawing speed of the melt by the rolling mill 37 by selecting a higher or lower rotation speed of the rotating rollers 39 of the rolling mill, so that the level of the melt 4 in the casting zone 5 is more or less constant, i.e. a melt depth of between 300 and 500 mm.

A second control loop, known as loop Y, controls the temperature of the melt and the casting zone. This control loop controls injection means 7 of the pulverulent material in the furnace and the power rating of torch 11. Control loop Y operates by receiving data concerning the temperature of melt 4 in the casting zone collected by temperature probe 29 of melt 4 in casting zone 5 and temperature probes 33 in casting zone 5 and, in the light of this data, selecting a higher or lower power rating for torch 11 and/or a higher or lower injection rate of pulverulent material so that the temperatures of the melt and the casting zone are maintained more or less constant, i.e. at between 1300 and 1500° C.

A third control loop, known as loop Z, controls the temperature of fusion zone 3. This control loop controls the height of the torch in the furnace. Control loop Z operates by receiving data collected by the temperature probes 31 in the fusion zone covered by the melt and by selecting a higher or lower torch height so that the temperature in the fusion zone is maintained more or less constant, i.e. between 1300 and 1500° C.

The height of the torch for a melt level in a 300 to 500 mm fusion zone is between 450 and 1000 mm.

Figure 4:
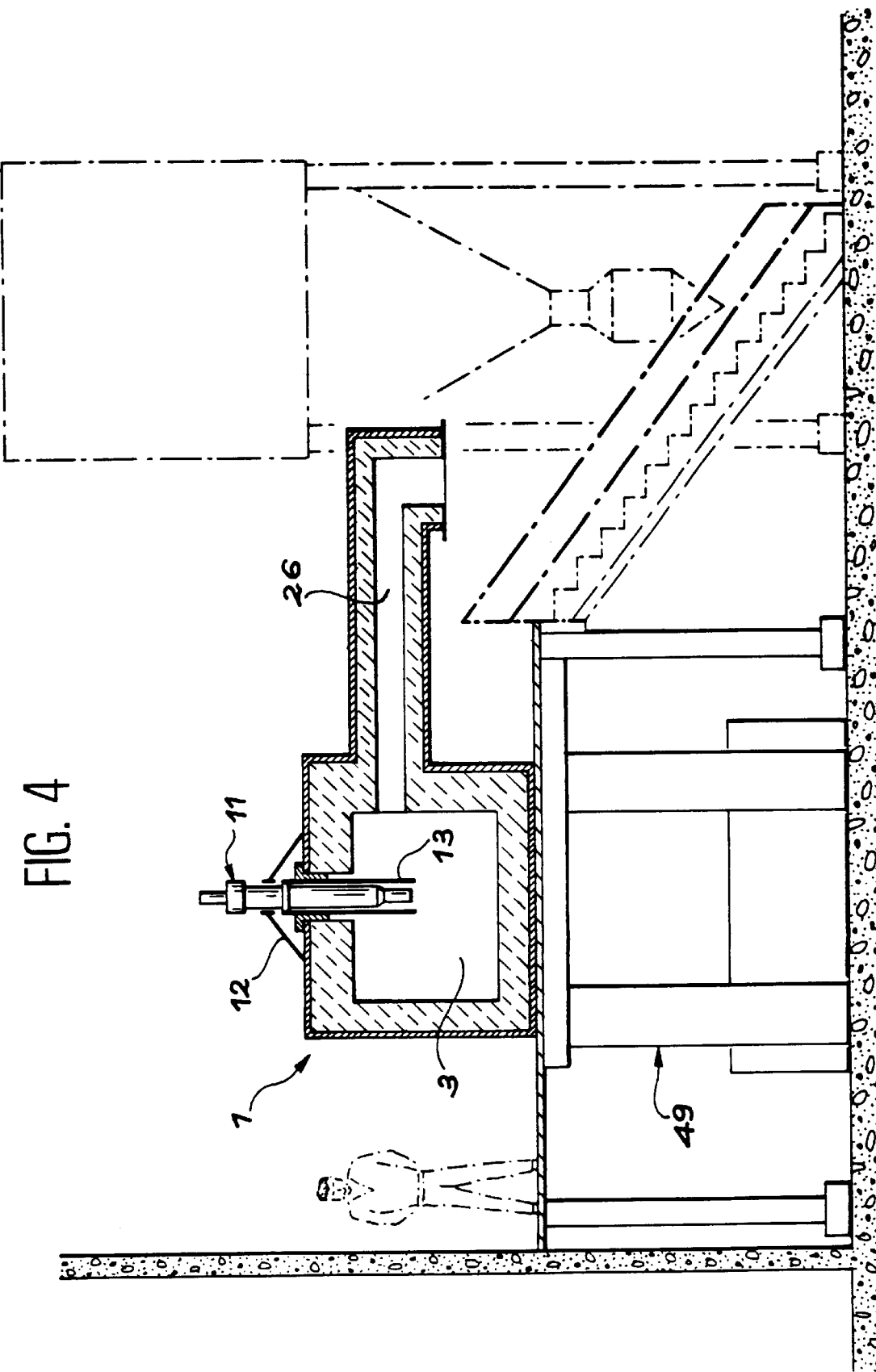
FIG. 4 is a diagram of an overall view of a cross-section through a continuous vitrification apparatus for pulverulent material according to the invention.

FIG. 4 is a general view of a cross section through an embodiment of the invention described in FIGS. 1 to 3.

This figure shows the presence of a flue 26 for extracting the fumes and gases given off as the pulverulent material starts to melt, together with adjustable bracket 12 that supports torch 11 and a structure 49 bearing the apparatus according to the invention in this embodiment.

The treatment capacity of the furnace in this example may vary between 150 and 400 kg of pulverulent material, plus any additives, per hour in dense mode.

In this example the pulverulent material injected is from the treatment of fumes produced during incineration of household waste.

For a nominal flow rate of 350 kg/hour the conveying gas flow rate in dense mode is of the order of 12 $Nm^3$/hour. This unit, $Nm^3$/hour, or normal cubic meters per hour, for the gas conveying the pulverulent material in dense mode relates to the conveying gas flow rate measured under normal conditions of temperature and pressure.

The injection lance inside the furnace has an internal diameter of 20 mm, this diameter being selected in terms of the injection rate of pulverulent material in the furnace.

The melt, composed of the mineral fraction of the injected pulverulent material, has a flow rate that may vary between 100 and 300 kg/hour, i.e. approximately 70 to 75% of the injection rate and runs out of the furnace by overflowing into the rolling mill which shapes and cools it to produce a strip of vitreous or crystalline material with a width of 150 to 200 mm and a thickness of 4 to 8 mm at a speed that may vary between 0.8 and 4 meters per minute.

Plasma torch 11 is dimensioned to be capable of melting the pulverulent material. It has an adjustable power rating that varies between approximately 175 and 700 kW.

In this embodiment the plasma flow is directed downwards and leaves the torch at a distance from the melt that is set to optimize heat transmission with the melt. This distance can be selected at between approximately 450 and 950 mm, preferably approximately 700 mm.

For a more or less constant flow rate of 350 kg/hour of pulverulent material entering the system, fusion requires a torch power rating of between 350 and 700 kW which is dependent firstly on the variable chemical composition of the material entering the system, and secondly on increases in furnace heat loss during continuous industrial operation. Under these conditions the power required for fusion may vary between approximately 1 kWh/kg and 1.75 kWh/kg.

The melt nominal depth in the fusion zone is 300 mm. The temperature is maintained at approximately 1300 to 1500° C. in the fusion zone and 1250 to 1300° C. in the casting zone.

The temperature of the fumes produced during fusion of the pulverulent material is of the order of 1500° C. at a flow rate of between 300 and 400 m³/hour for 350 kg of pulverulent material injected into the furnace per hour. The unit of Nm³/hour relates to the flow rate in cubic meters per hour of gas and fumes given off as the pulverulent material starts to melt, measured under normal temperature and pressure conditions (273° K., 101325 Pa).

The melt that overflows out of the furnace to be drawn is cooled as it leaves the furnace. At this point it is a vitrified product whose composition lies in the vitreous zone of the phase plot of the $CaO$-$Al_2O_3$-$SiO_2$ system, in a zone where the melting point is relatively low, at the values given above. Moreover, the composition of the vitrified product gives it a high level of resistance to hydrolysis and therefore long-term characteristics that make it suitable for recycling as, for example, hard core for road building. For example, the average percentages of $CaO$, $Al_2O_3$ and $SiO_2$ are 37%, 16% and 34% respectively in the pulverulent material produced by the incineration of household waste treated in the present example.

When injection of pulverulent material is halted the furnace temperature can be maintained using the plasma torch. The inventors have called this method of maintaining the temperature "Torch standby mode".

The plasma torch may thus be used as an energy source to maintain the furnace temperature when injection of pulverulent material is halted. In this mode the torch only provides the energy required to maintain the temperature of the furnace and the melt, which is normally between 175 and 250 kW. This operating mode prevents the refractories being subject to thermal shocks, the torch having the additional advantage of maintaining not only the average temperature value but also the gradients inevitable when ash is injected at ambient temperature.

EXAMPLE OF A MODIFIED EMBODIMENT OF THE INVENTION

In this modification, the apparatus is as described above except for the means for injecting pulverulent material into the furnace. In this modification the injection means used is a screw-type injector. This screw-type injector is positioned in the furnace so that the pulverulent material is injected onto the melt.

Figure 5:
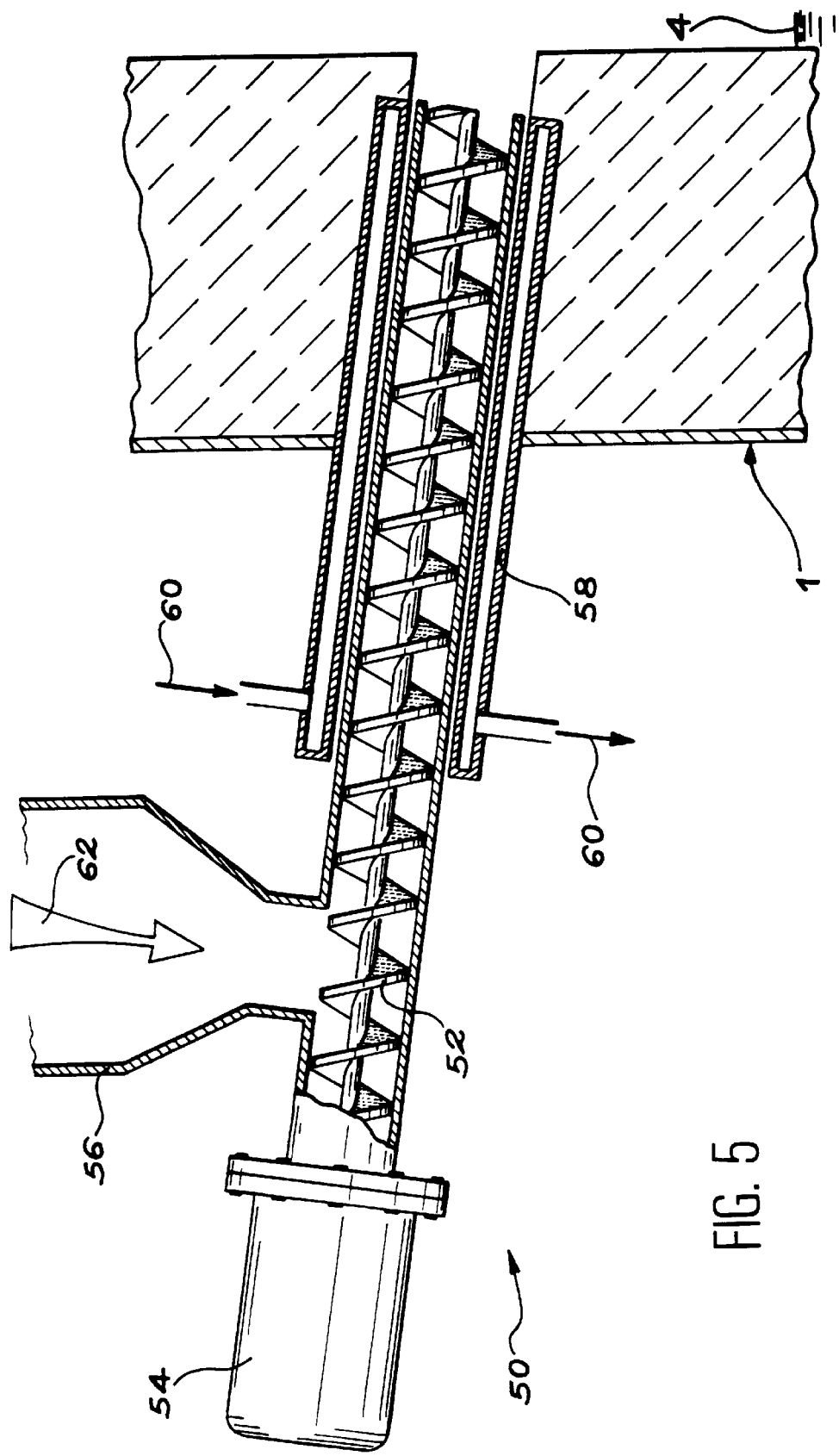
FIG. 5 is a diagram of a section through a screw-type injection apparatus for injecting pulverulent material into the furnace.

FIG. 5 is a schematic view of the screw-type injector used in this example. In this figure the injector is numbered 50. It comprises a screw 52, a motor 54 and a hopper 56 that feeds pulverulent material into screw 52.

The screw 52 used to introduce pulverulent material into furnace 1 is a solid Archimedes screw tilted at an angle of 5 to 200 relative to the surface of the melt numbered 4. Screw-type injector 50 is enclosed in a metal sheath 58 that is cooled by a water circuit shown schematically by arrows 60. The screw 52 is 400 mm long and has a diameter, including the cooled sheath, of the order of 90 mm and the intersection of the axis of the screw with the inner wall of the furnace is approximately 150 mm above the melt 4. The end of screw-type injector 50 passes through the wall of furnace 1.

The introduction of pulverulent material into the fusion zone is controlled by using two screws connected in series. The first screw (not shown in FIG. 5) lies outside the furnace and is used to vary the flow rate of pulverulent material (shown schematically by arrow 62) by varying the speed of the screw. The second screw, numbered 52, is coupled to the furnace and operates at constant speed to introduce pulverulent material into the furnace.

The screw introducing pulverulent material into the furnace is tilted at an angle of 5 to 30° relative to the surface of the melt, and preferably 5 to 10°. This screw introduces pulverulent material above the melt at a distance from the melt of between 5 and 50 cm. Good results have been obtained using a distance of 10 to 20 centimeters. By controlling the rotation speed of the screw, these injection means allow injection of pulverulent material to be either continuous or discontinuous. This type of injection also limits the fly-off of pulverulent material, for example into gas and fume treatment apparatus and also optimizes the thermal balance of the melting.

The introduction of pulverulent material may be set at an approximate rate of up to 1200 kg of material per hour. This setting is variable and dependent, in particular, on the volume of the melt in the fusion zone and casting zone of the furnace, on the power rating of the torch and the overflow and drawing of the melt outside the furnace.

This screw-type method of introducing or injecting material has the following characteristics:

- the advantage of using mechanical pushing means to introduce pulverulent material can be seen at the apparatus outlet in the continuity of the solid medium composed of pulverulent material,
- the absence or minimization of the quantity of gas used to operate the apparatus reduces the amount of residual material fly-off before treatment.

Under the conditions described above, injection of 300 to 700 kg of pulverulent material per hour gave excellent results as concerned the final vitrified product.

What is claimed is:

1. A process for vitrifying a pulverulent material, comprising the steps of:
providing a furnace having a fusion zone extending in a horizontal direction, a casting zone provided in the horizontal direction away from where the pulverulent material is introduced into the fusion zone, and a non-transferring arc plasma torch positioned such that a flowing plasma of the non-transferring arc plasma torch depresses a surface of a melt in the fusion zone;
introducing the pulverulent material laterally into the fusion zone in the furnace;
melting the pulverulent material by the non-transferring arc plasma torch;
distorting the surface of the melt with the flowing plasma of the non-transferring are plasma torch such that the surface of the melt is sufficiently depressed and hydrodynamic movements are created in the melt; and
removing the melt from the furnace via the casting zone by overflowing.

2. A process of claim 1, wherein the removing step comprises overflowing and drawing said melt from the furnace via the casting zone.

3. A process of claims 1 or 2, wherein the introducing step comprises injecting the pulverulent material in an injection direction having a vertical component and a horizontal component.

4. A process of claim 1, further comprising controlling the introducing and overflowing steps to maintain a substantially constant melt level in the casting zone.

5. A process of claim 2, further comprising controlling the introducing and drawing steps to maintain a substantially constant melt level in the casting zone.

6. A process of claim 2, further comprising controlling the introducing and drawing steps to maintain a substantially constant melt level in the casting zone.

7. A process of claim 1, wherein the melting step comprises controlling a height of the non-transferring arc plasma torch to maintain a constant temperature in the fusion zone.

8. A process of claim 2, wherein the injecting step and the overflowing and drawing of the removing step, and the non-transferring arc plasma torch are controlled.

9. A process of claim 1, wherein the introducing step comprises injecting the pulverulent material into the melt.

10. A process of claim 3, wherein the introducing step comprises injecting the pulverulent material onto the melt.

11. A process of claim 10, wherein the injecting step comprises controlling the horizontal and vertical components in which the pulverulent material is injected.

12. A process of claim 1, wherein the introducing step comprises injecting the pulverulent material in dense mode using a conveying gas.

13. A process of claim 1, wherein the fusion zone is substantially cylindrical in shape.

14. A process of claim 1, further comprising maintaining the melt at a temperature of 1300 to 1500° C.

15. A process of claim 1, further comprising cooling the fusion zone in contact with the melt for auto-crucible operation.

16. A process of claim 1, wherein the non-transferring arc plasma torch is directed downwards so that plasma flows substantially onto a center portion of the melt in relation to the fusion zone.

17. A process of claim 2, wherein the drawing of the melt is effected by an apparatus filled with cooled rollers that draw the melt into a vitrified material.

18. A process of claim 17, wherein the drawn vitrified material is rolled.

19. A process of claim 1, further comprising extracting fumes and gases produced by the melt at a temperature greater than or equal to 1200° C.

20. A process of claim 19, further comprising collecting and quenching the fumes and gases that are extracted from the furnace.

21. A process of claim 1, wherein the introducing step comprises adding at least one additive which increases fluidity and slip of the melt in the furnace.

22. A vitrification apparatus for vitrifying a pulverulent material, comprising:
  a furnace including a fusion zone for melting pulverulent material and a casting zone for removing melted material, the fusion zone extending in a horizontal direction, the casting zone provided along the horizontal direction away from the fusion zone;
  at least one injecting device configured to inject the pulverulent material laterally into the fusion zone;
  at least one non-transferring arc plasma torch positioned such that a flowing plasma of the at least one non-transferring arc plasma torch depresses a surface of a melt in the fusion zone; and
  at least one overflow device configured to cause the melt to overflow from the casting zone.

23. A vitrification apparatus of claim 22, further comprising drawing means for drawing the melt coupled to the at least one overflow device.

24. A vitrification apparatus of claims 22 or 23, wherein the at least one injecting device is configured to be oriented in a vertical direction.

25. A vitrification apparatus of claim 23, further comprising a controller configured to control the at least one injecting device and the drawing means so as to set a level of the melt in the furnace.

26. A vitrification apparatus of claim 22 further comprising a controller configured to control the at least one injecting device and the overflow device so as to set a level of the melt in the furnace.

27. A vitrification apparatus of claim 22, further comprising a controller configured to control the at least one injecting device and a power rating of the non-transferring arc plasma torch so as to set temperatures of the melt and the casting zone.

28. A vitrification apparatus of claim 22, further comprising a controller configured to control a height of the non-transferring arc plasma torch in the furnace so as to set temperature of the fusion zone.

29. A vitrification apparatus of claim 23, wherein the at least one injecting device, the non-transferring arc plasma torch, the overflow device and the drawing means are controlled by at least one control loop.

30. A vitrification apparatus of claim 22, wherein the at least one injecting device comprises a pneumatic injection device capable of operating in dense mode.

31. A vitrification apparatus of claim 22, wherein the at least one injecting device comprises a screw injector.

32. A vitrification apparatus of claim 22, wherein the non-transferring arc plasma torch is protected by a sheath made of a refractory material.

33. A vitrification apparatus of claim 23, wherein the drawing means is a laminating apparatus with cooled rollers.

34. A vitrification apparatus of claim 22, further comprising a flue for extracting fumes and gases.

35. A vitrification apparatus of claim 22, wherein the pulverulent material is treated on line with an existing household waste incineration plant, and in which gases and fumes produced during melting of the pulverulent material are treated on line with an apparatus for treating the gases and fumes of the household waste incineration plant.

* * * * *